United States Patent
Yamazaki

(10) Patent No.: US 12,420,782 B2
(45) Date of Patent: Sep. 23, 2025

(54) VEHICLE CONTROL APPARATUS

(71) Applicant: TOYOTA JIDOSHA KABUSHIKI KAISHA, Toyota (JP)

(72) Inventor: Shotaro Yamazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 18/471,830

(22) Filed: Sep. 21, 2023

(65) Prior Publication Data
US 2024/0140411 A1 May 2, 2024

(30) Foreign Application Priority Data

Nov. 1, 2022 (JP) .................................. 2022-175283

(51) Int. Cl.
 *B60W 30/09* (2012.01)
 *B60W 30/095* (2012.01)
 *B60W 30/14* (2006.01)
 *B60W 60/00* (2020.01)

(52) U.S. Cl.
 CPC ........ *B60W 30/09* (2013.01); *B60W 30/0956* (2013.01); *B60W 30/146* (2013.01); *B60W 60/0015* (2020.02); *B60W 2554/801* (2020.02)

(58) Field of Classification Search
 CPC ............. B60W 30/09; B60W 60/0015; B60W 30/0956; B60W 30/146; B60W 2554/801
 See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 2019/0001937 A1* | 1/2019 | Ito | B60W 30/09 |
| 2020/0139962 A1* | 5/2020 | Kim | B60W 10/18 |
| 2020/0391733 A1* | 12/2020 | Kumagai | B60T 8/17558 |
| 2021/0061309 A1 | 3/2021 | Kawanai | |
| 2021/0107521 A1 | 4/2021 | Fujita et al. | |

(Continued)

FOREIGN PATENT DOCUMENTS

| | | |
|---|---|---|
| JP | 2020-199962 A | 12/2020 |
| JP | 2022-112274 A | 8/2022 |

*Primary Examiner* — Jelani A Smith
*Assistant Examiner* — Gabriel Anfinrud
(74) *Attorney, Agent, or Firm* — Sughrue Mion, PLLC

(57) ABSTRACT

A vehicle control apparatus executes a collision avoidance control when a collision condition becomes satisfied. The collision condition includes a condition that a lap rate of the own vehicle and the object is equal to or greater than a lap rate threshold. The threshold set when the own vehicle turns, is greater than the threshold set when the own vehicle does not turn. The threshold set when a condition satisfaction period of time is equal to or greater than a predetermined period of time, is smaller than the threshold set when the condition satisfaction period of time is smaller than the predetermined period of time. The condition satisfaction period of time is a period of time that a collision probability condition continues being satisfied while the own vehicle is turning. The collision probability condition is a condition that the own vehicle has a probability of colliding with the object.

4 Claims, 4 Drawing Sheets

(56) References Cited

U.S. PATENT DOCUMENTS

| | | |
|---|---|---|
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0227359 A1 | 7/2022 | Shimizu et al. |
| 2023/0090474 A1* | 3/2023 | Ohba ........................ B60T 7/22 |
| | | 701/301 |
| 2024/0075923 A1* | 3/2024 | Kassar .............. B60W 30/0956 |

\* cited by examiner

VEHICLE CONTROL APPARATUS

CROSS-REFERENCE TO RELATED APPLICATIONS

This application claims priority to Japanese patent application No. JP 2022-175283 filed on Nov. 1, 2022, the content of which is hereby incorporated by reference in its entirety.

BACKGROUND

Field

The present invention relates to a vehicle control apparatus.

Description of the Related Art

There is known a vehicle control apparatus which executes a collision avoidance control to avoid a collision of an own vehicle with another vehicle while the own vehicle is turning (for example, refer to JP 2022-112274 A).

A lap rate of the own vehicle and the object can be used for determining whether the own vehicle collides with the other vehicle while the own vehicle is turning. The lap rate is an index value which represents a degree that the own vehicle and the object overlap in a width direction of the own vehicle. The degree that the own vehicle and the object overlap, increases as the lap rate increases.

For example, a condition that the lap rate is equal to or greater than a predetermined value or a lap rate threshold, may be used as a condition for determining that the own vehicle collides with the object. In this case, when the own vehicle turns, a range that the lap rate changes, is great, compared with when the own vehicle moves straight. Therefore, an accuracy of determining that the own vehicle collides with the object can be improved by setting the lap rate threshold such that the lap rate threshold set when the own vehicle turns, is greater than the lap rate threshold set when the own vehicle moves straight.

However, the range that the lap rate changes, varies between the first half and the latter half of turning of the own vehicle. Therefore, if the lap rate threshold is kept at a constant value while the own vehicle is turning, the accuracy of determining that the own vehicle collides with the object, may be decreased.

SUMMARY

An object of the present invention is to provide a vehicle control apparatus which can accurately determine whether the own vehicle collides with the object while the own vehicle is turning.

A vehicle control apparatus according to the present invention comprises an electronic control unit configured to execute a collision avoidance control to avoid a collision of an own vehicle with an object ahead of the own vehicle by autonomously decelerating the own vehicle when a collision condition that the own vehicle collides with the object, becomes satisfied. The collision condition includes a condition that a lap rate of the own vehicle and the object is equal to or greater than a lap rate threshold. The electronic control unit is configured to set the lap rate threshold such that the lap rate threshold set when the own vehicle turns, is greater than the lap rate threshold set when the own vehicle does not turn. The electronic control unit is configured to set the lap rate threshold such that the lap rate threshold set when a condition satisfaction period of time is equal to or greater than a predetermined period of time, is smaller than the lap rate threshold set when the condition satisfaction period of time is smaller than the predetermined period of time. The condition satisfaction period of time is a period of time that a collision probability condition continues being satisfied while the own vehicle is turning. The collision probability condition is a condition that the own vehicle has a probability of colliding with the object.

When the own vehicle starts to turn, and the object exists ahead of the own vehicle, a behavior of the own vehicle is stable before a certain period of time elapses since the own vehicle starts to turn. In this case, a range that the lap rate changes, is relatively great. Thus, even when the own vehicle can pass by the object without colliding with the object, the lap rate may become great. Therefore, if the lap rate threshold is set to a small value, the lap rate may become equal to or greater than the lap rate threshold when the own vehicle becomes close to object to pass by the object. In this case, the collision avoidance control may be executed. That is, a collision of the own vehicle and the object cannot be accurately determined while the own vehicle is turning.

With the vehicle control apparatus according to the present invention, when the own vehicle starts to turn, and the object exists ahead of the own vehicle, the lap rate threshold is set to a great value until the predetermined period of time elapses since the collision probability condition becomes satisfied. Thus, the collision avoidance control is not executed when the own vehicle does not collide with the object at an initial stage of turning of the own vehicle that the behavior of the own vehicle is not stable. That is, the collision of the own vehicle with the object can be accurately determined while the own vehicle is turning.

As the period of time that elapses since the own vehicle starts to turn increases, the behavior of the own vehicle becomes stable. In this case, the range that the lap rate changes, is small. Thus, if the lap rate threshold is still set to the great value, the collision avoidance control is not executed although the own vehicle collides with the object. That is, the collision of the own vehicle with the object cannot be accurately determined while the own vehicle is turning.

With the vehicle control apparatus according to the preset invention, the lap rate threshold is set to a small value after the predetermined period of time elapses since the own vehicle starts to turn. Therefore, the collision avoidance control is surely executed when the own vehicle has a high probability of colliding with the object. That is, the collision of the own vehicle with the object can be accurately determined while the own vehicle is turning.

In the vehicle control apparatus according to an aspect of the present invention, the electronic control unit may be configured to set the lap rate threshold, depending on the condition satisfaction period of time when the condition satisfaction period of time is equal to or greater than the predetermined period of time.

The behavior of the own vehicle while the own vehicle is turning becomes stable as a period of time elapsing since the own vehicle starts to turn increases. As a result, the range that the lap rate changes, decreases as the period of time elapsing since the own vehicle starts to turn, increases. Therefore, in order to appropriately execute the collision avoidance control, the lap rate threshold should be set, depending on the period of time elapsing since the own vehicle starts to turn. With the vehicle control apparatus according to this aspect of the present invention, when the condition satisfaction period of time is equal to or greater than the predetermined period of time, the lap rate threshold is set, depending on the condition satisfaction period of time. Thus, the collision avoidance control can be appropriately executed.

In the vehicle control apparatus according to another aspect of the present invention, the electronic control unit may be configured to set the lap rate threshold such that the lap rate threshold decreases as the condition satisfaction period of time increases when the condition satisfaction period of time is equal to or greater than the predetermined period of time.

As described above, the range that the lap rate changes, decreases as the period of time elapsing since the own vehicle starts to turn, increases. With the vehicle control apparatus according to this aspect of the present invention, when the condition satisfaction period of time is equal to or greater than the predetermined period of time, the lap rate threshold is set such that the lap rate threshold decreases as the condition satisfaction period of time increases. Thus, the collision avoidance control can be further appropriately executed.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, a vehicle control apparatus according to an embodiment of the present invention will be described with reference to the drawings. Hereinafter, the vehicle control apparatus 10 will be described by exemplifying that an operator of the own vehicle 100 is a person who is in the own vehicle 100 and drives the own vehicle 100, i.e., a driver of the own vehicle 100. Therefore, in the present embodiment, the vehicle control apparatus 10 is mounted on the own vehicle 100 as shown in FIG. 1.

However, the operator of the own vehicle 100 may be a remote operator of the own vehicle 100, i.e., an operator who is not in the own vehicle 100 but remotely drives the own vehicle 100. When the operator of the own vehicle 100 is the remote operator, the vehicle control apparatuses 10 are mounted on the own vehicle 100 and a remote operation facility installed outside the own vehicle 100 for remotely driving the own vehicle 100, respectively. In this case, functions of the vehicle control apparatus 10 described below are realized by the vehicle control apparatus 10 mounted on the own vehicle 100 and the vehicle control apparatus 10 mounted on the remote operation facility.

The vehicle control apparatus 10 includes an ECU 90 as a control device. The ECU 90 is an electronic control unit. The ECU 90 includes a microcomputer as a main component. The microcomputer includes a CPU, a ROM, a RAM, a non-volatile memory, and an interface. The CPU implements various functions by executing instructions, programs, or routines stored in the ROM. In the present embodiment, the vehicle control apparatus 10 includes one ECU, but the vehicle control apparatus 10 may include a plurality of the ECUs and execute various processes described later by the ECUs.

Figure 1:
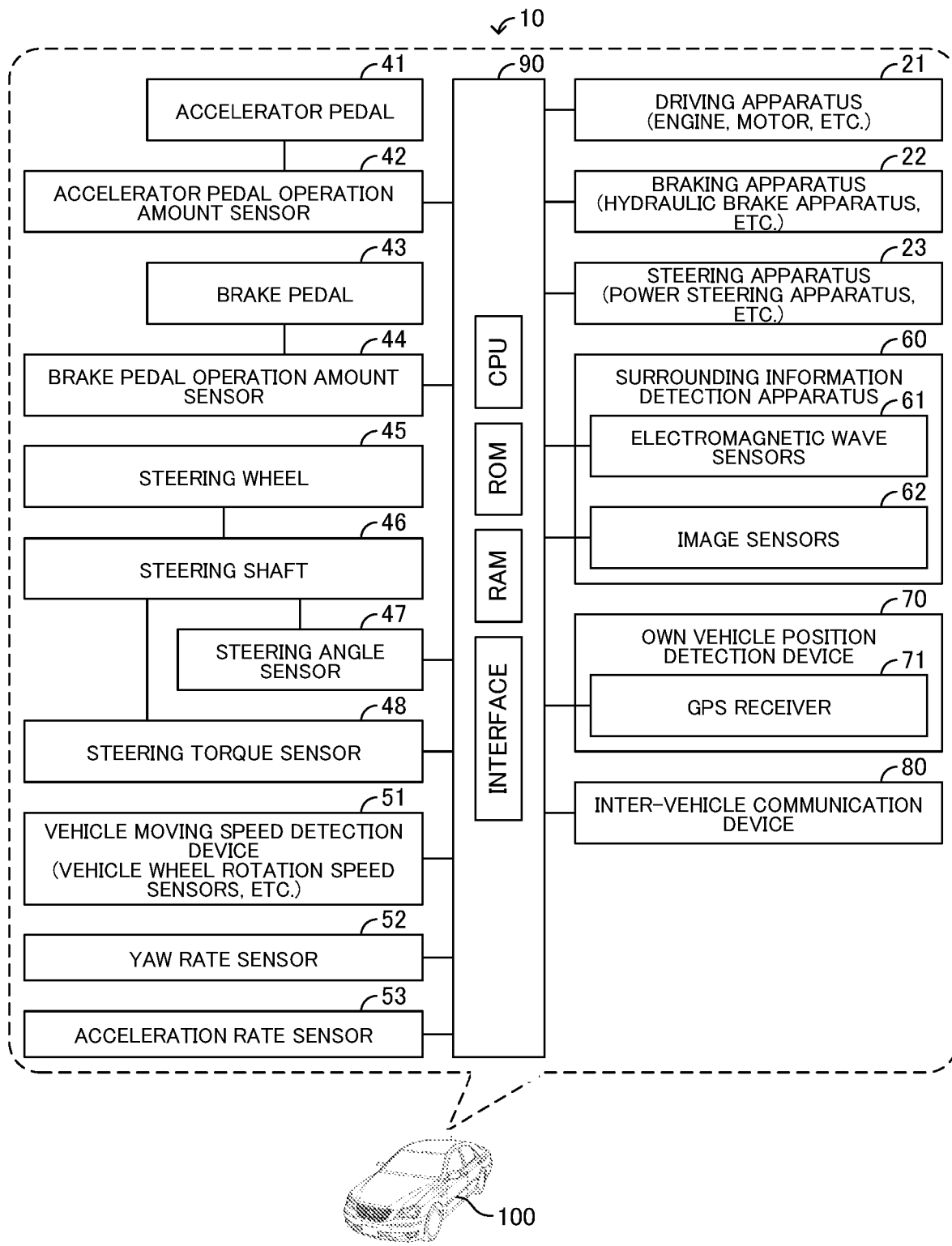
FIG. 1 is a view which shows a vehicle control apparatus according to an embodiment of the present invention.

As shown in FIG. 1, the own vehicle 100 is equipped with a driving apparatus 21, a braking apparatus 22, and a steering apparatus 23.

The driving apparatus 21 is an apparatus which outputs a driving force applied to the own vehicle 100. The driving apparatus 21 includes, for example, an internal combustion engine and/or at least one electric motor. The driving apparatus 21 is electrically connected to the ECU 90. The ECU 90 can control the driving force outputted from the driving apparatus 21.

The braking apparatus 22 is an apparatus which applies a braking force to the own vehicle 100. The braking apparatus 22 is, for example, a hydraulic brake apparatus. The braking apparatus 22 is electrically connected to the ECU 90. The ECU 90 can control the braking force applied to the own vehicle 100 by the braking apparatus 22.

The steering apparatus 23 is an apparatus that applies a steering force to the own vehicle 100. The steering apparatus 23 is, for example, a power steering apparatus. The steering apparatus 23 is electrically connected to the ECU 90. The ECU 90 can control the steering force applied to the own vehicle 100 by the steering apparatus 23.

Further, the own vehicle 100 is equipped with an accelerator pedal 41, an accelerator pedal operation amount sensor 42, a brake pedal 43, a brake pedal operation amount sensor 44, a steering wheel 45, a steering shaft 46, a steering angle sensor 47, a steering torque sensor 48, a vehicle moving speed detection device 51, a yaw rate sensor 52, an acceleration rate sensor 53, a surrounding information detection apparatus 60, an own vehicle position detection device 70, and an inter-vehicle communication device 80.

The accelerator pedal 41 is a device operated by a driver of the own vehicle 100 to accelerate the own vehicle 100. The accelerator pedal operation amount sensor 42 is a device which detects an operation amount of the accelerator pedal 41. In this regard, when the operator of the own vehicle 100 is the remote operator of the own vehicle 100, the accelerator pedal 41 and the accelerator pedal operation amount sensor 42 are mounted on the remote operation facility.

The accelerator pedal operation amount sensor 42 is electrically connected to the ECU 90. The ECU 90 acquires the operation amount of the accelerator pedal 41 as an accelerator pedal operation amount AP by the accelerator pedal operation amount sensor 42. The ECU 90 calculates and acquires an acceleration rate of the own vehicle 100 requested by the driver as a driver-requested acceleration rate Ga_driver, based on the accelerator pedal operation amount AP. When the driver-requested acceleration rate Ga_driver is greater than zero, the ECU 90 executes a normal moving control for controlling the driving force outputted from the driving apparatus 21 such that the driver-requested acceleration rate Ga_driver is achieved, except when a collision avoidance control described later is executed.

The brake pedal 43 is a device operated by the driver to decelerate the own vehicle 100. The brake pedal operation amount sensor 44 is a device which detects an operation amount of the brake pedal 43. In this regard, when the operator of the own vehicle 100 is the remote operator of the own vehicle 100, the brake pedal 43 and the brake pedal operation amount sensor 44 are mounted on the remote operation facility.

The brake pedal operation amount sensor 44 is electrically connected to the ECU 90. The ECU 90 acquires the operation amount of the brake pedal 43 as a brake pedal operation amount BP by the brake pedal operation amount sensor 44. The ECU 90 calculates and acquires a deceleration rate of the own vehicle 100 requested by the driver as a driver-requested deceleration rate Gd_driver, based on the brake pedal operation amount BR When the driver-requested deceleration rate Gd_driver is greater than zero, the ECU 90 executes the normal moving control for controlling the braking force applied by the braking apparatus 22 to the own vehicle 100 such that the driver-requested deceleration rate Gd_driver is achieved, except when the collision avoidance control described later is executed.

The steering angle sensor 47 is a sensor which detects a rotation angle of the steering shaft 46 with respect to its neutral position. The steering angle sensor 47 is electrically connected to the ECU 90. The ECU 90 acquires the rotation angle of the steering shaft 46 as a steering angle θ by the steering angle sensor 47.

The steering torque sensor 48 is a sensor which detects a torque inputted to the steering shaft 46 by the driver via the steering wheel 45. The steering torque sensor 48 is electrically connected to the ECU 90. The ECU 90 acquires the torque inputted to the steering shaft 46 by the driver via the steering wheel 45 by the steering torque sensor 48 as a driver input torque TQ_driver.

The vehicle moving speed detection device 51 is a device which detects a moving speed of the own vehicle 100. The vehicle moving speed detection device 51 includes, for example, vehicle wheel rotation speed sensors provided on respective vehicle wheels of the own vehicle 100. The vehicle moving speed detection device 51 is electrically connected to the ECU 90. The ECU 90 acquires the moving speed of the own vehicle 100 as an own vehicle moving speed V by the vehicle moving speed detection device 51.

The ECU 90 calculates the steering force (or a steering torque) requested by the driver as a requested steering force (or a requested steering torque), based on the steering angle θ, the driver input torque TQ_driver, and the own vehicle moving speed V. The ECU 90 controls an operation of the steering apparatus 23 such that the steering force corresponding to the requested steering force is applied from the steering apparatus 23 to the own vehicle 100.

The yaw rate sensor 52 is a sensor that detects a yaw rate of the own vehicle 100. The yaw rate sensor 52 is electrically connected to the ECU 90. The ECU 90 acquires the yaw rate of the own vehicle 100 as a yaw rate YR by the yaw rate sensor 52.

The acceleration rate sensor 53 is a sensor which detects an acceleration rate of the own vehicle 100 in a longitudinal direction (or a front-rear direction) of the own vehicle 100 and an acceleration rate of the own vehicle in a lateral direction (or a width direction) of the own vehicle 100. The acceleration rate sensor 53 is electrically connected to the ECU 90. The ECU 90 acquires the longitudinal acceleration rate of the own vehicle 100 as a longitudinal acceleration rate Gx by the acceleration rate sensor 53, and acquires the lateral acceleration rate of the own vehicle 100 as a lateral acceleration rate Gy.

The surrounding information detection apparatus 60 is an apparatus which acquires information on a situation around the own vehicle 100. The surrounding information detection apparatus 60 includes electromagnetic wave sensors 61 and image sensors 62 in the present embodiment.

The electromagnetic wave sensor 61 is a sensor which acquires object data, i.e., data on objects around the own vehicle 100. The electromagnetic wave sensor 61 is, for example, a radio wave sensor such as a radar sensor such as a millimeter wave radar, a sound wave sensor such as an ultrasonic sensor such as a clearance sonar, and an optical sensor such as a laser radar such as a LiDAR. The electromagnetic wave sensor 61 transmits electromagnetic waves and receives reflected waves, i.e., the electromagnetic waves reflected by the objects. The object data is information on the transmitted electromagnetic waves and the reflected waves. The electromagnetic wave sensors 61 are electrically connected to the ECU 90. The ECU 90 acquires the object data from the electromagnetic wave sensors 61 as surrounding detection information IS.

The image sensor 62 is a sensor which captures images of views around the own vehicle 100 to acquire image data. The image sensor 62 is, for example, a camera sensor. The image sensors 62 are electrically connected to the ECU 90. The ECU 90 acquires the image data from the image sensors 62 as the surrounding detection information IS.

The inter-vehicle communication device 80 is a device which performs wireless communication or inter-vehicle communication with ECUs of other vehicles. The inter-vehicle communication device 80 is electrically connected to the ECU 90. The ECU 90 can acquire, as the surrounding detection information IS, the surrounding detection information (for example, the object data and the image data) transmitted by the ECUs of the other vehicles in the vicinity of the own vehicle 100 via the inter-vehicle communication device 80.

The own vehicle position detection device 70 is a device which detects a position of the own vehicle 100. In particular, in the present embodiment, the own vehicle position detection device 70 is a device which receives GPS signals and acquires a present position of the own vehicle 100. In the present embodiment, the own vehicle position detection device 70 includes a GPS receiver 71. The GPS receiver 71 receives the GPS signals. The GPS receiver 71 is electrically connected to the ECU 90. The ECU 90 acquires an own vehicle position, i.e., the present position of the own vehicle 100 as the surrounding detection information IS, based on the GPS signals received by the GPS receiver 71.

It should be noted that the surrounding information detection apparatus 60 may include a device that receives information wirelessly transmitted from a facility provided on the side of the road, and may be configured to acquire the information as the surrounding detection information IS.

<Operations of Vehicle Control Apparatus>

Next, operations of the vehicle control apparatus 10 will be described. As described below, the vehicle control apparatus 10 executes a collision avoidance control as an automatic driving control to autonomously decelerate the own vehicle 100 to avoid a collision of the own vehicle 100 with the object when a collision condition that the own vehicle 100 collides with the object ahead of the own vehicle 100, becomes satisfied. The object to be avoided of collision by the collision avoidance control is, for example, a preceding vehicle ahead the own vehicle 100, a pedestrian, and a structure such as a guardrail. The operations of the vehicle control apparatus 10 when the object to be avoided of collision by the collision avoidance control is the preceding vehicle will be described below.

It should be noted that the vehicle control apparatus 10 detects the object such as the preceding vehicle, the pedestrian, or the structure ahead of the own vehicle 100, based on the surrounding detection information IS. The preceding vehicle is another vehicle moving in front of the own vehicle 100 within a predetermined distance range from the own vehicle 100.

Figure 2:
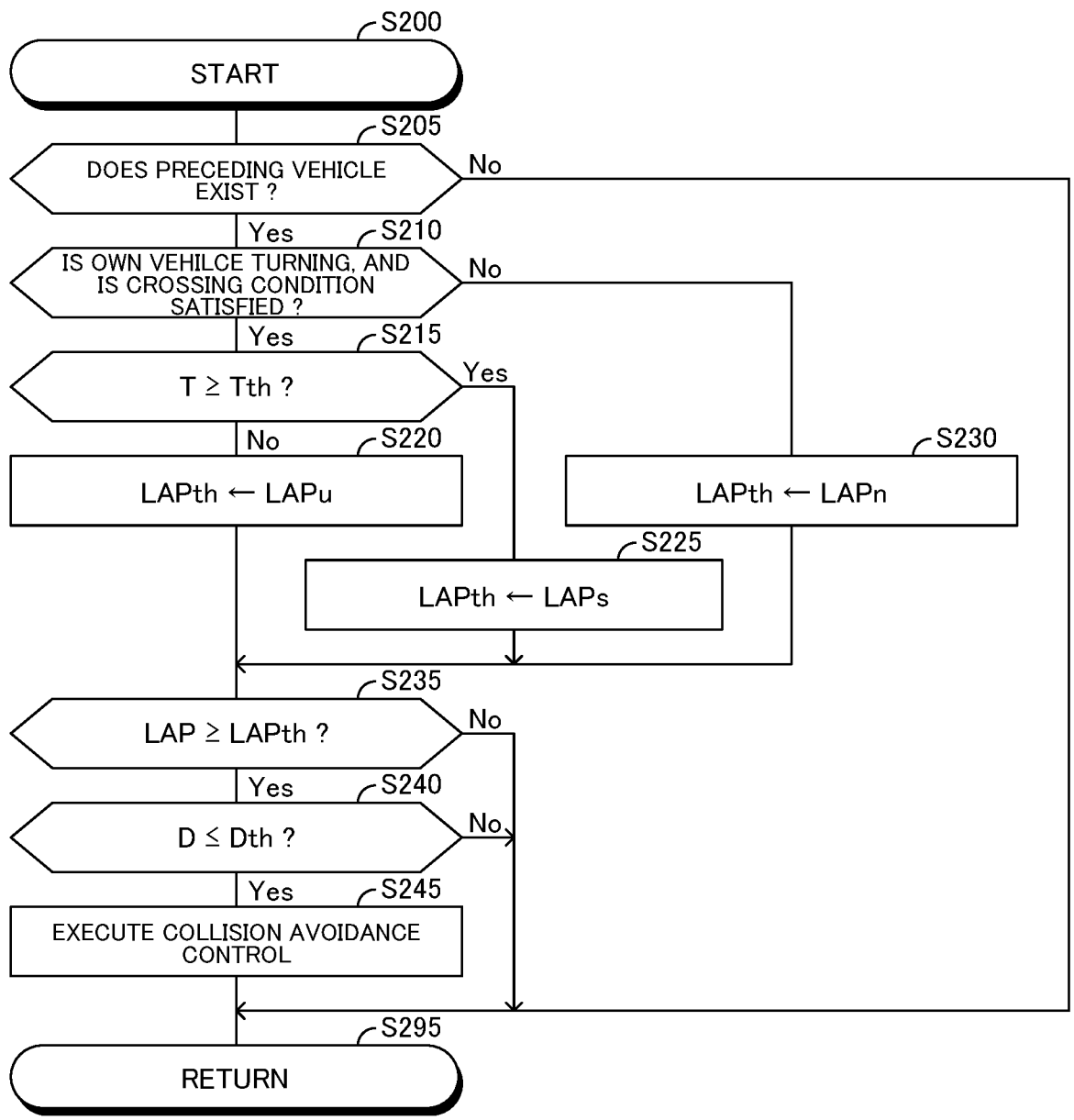
FIG. 2 is a view which shows a flowchart of a routine executed by the vehicle control apparatus according to the embodiment of the present invention.

The vehicle control apparatus 10 is configured to execute a routine shown in FIG. 2 at a predetermined calculation cycle. Therefore, at a predetermined timing, the vehicle control apparatus 10 starts a process from a step S200 of the routine shown in FIG. 2 and proceeds with the process to a step S205 to determine whether the preceding vehicle 200 exists.

When the vehicle control apparatus 10 determines "Yes" at the step S205, the vehicle control apparatus 10 proceeds with the process to a step S210 to determine whether (i) the own vehicle 100 is turning on a curve road or the like, and a crossing condition is satisfied. In other words, the vehicle control apparatus 10 determines whether (i) a collision probability condition that the own vehicle 100 is turning, and (ii) the own vehicle 100 collides with the preceding vehicle 200 is satisfied.

It should be noted that the vehicle control apparatus 10 determines whether the own vehicle 100 is turning, based on the steering angle θ, the yaw rate YR, the lateral acceleration rate Gy, and the like.

Figure 3:
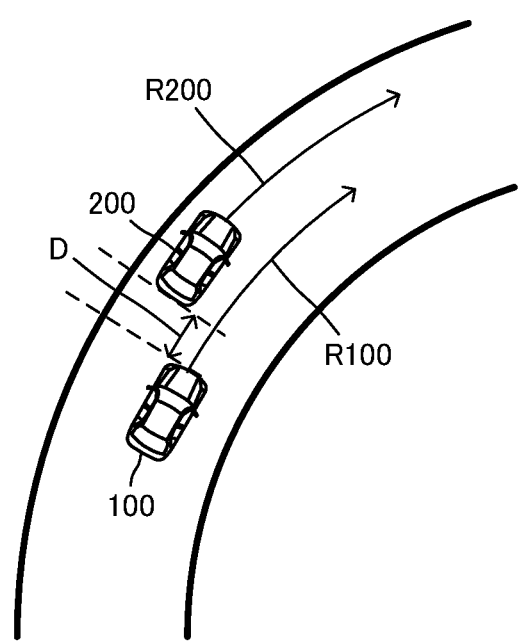
FIG. 3 is a view which shows a scene in which a preceding vehicle is present ahead of an own vehicle while the own vehicle is turning.

The crossing condition is a condition that a predicted moving route R100 of the own vehicle 100 crosses a predicted moving route R200 of the preceding vehicle 200. As shown in FIG. 3, the predicted moving route R100 of the own vehicle 100 is a route on which the own vehicle 100 is predicted to move in the future, and the predicted moving route R200 of the preceding vehicle 200 is a route on which the preceding vehicle 200 is predicted to move in the future. The vehicle control apparatus 10 acquires the predicted moving route R100 of the own vehicle 100, based on the steering angle θ of the own vehicle 100, the yaw rate YR of the own vehicle 100, the lateral acceleration rate Gy of the own vehicle 100, the surrounding detection information IS, and the like, and acquires the predicted moving route R200 of the preceding vehicle 200, based on the surrounding detection information IS.

When the vehicle control apparatus 10 determines "Yes" at the step S210, the vehicle control apparatus 10 proceeds with the process to a step S215 and determines whether a condition satisfaction period of time T is equal to or greater than a predetermined period of time or a predetermined condition satisfaction period of time Tth.

The condition satisfaction period of time T is a period of time during which the vehicle control apparatus 10 continues determining "Yes" for the preceding vehicle 200 at the step S210 since the vehicle control apparatus 10 first determines "Yes" for the same preceding vehicle 200 at the step S210. That is, the condition satisfaction period of time T is a period of time during which the collision probability condition continues being satisfied, and is also an index value which indicates the number of times that the collision probability condition is determined to be satisfied.

When the vehicle control apparatus 10 determines "No" at the step S215, the vehicle control apparatus 10 proceeds with the process to a step S220 to set a lap rate threshold LAPth to a predetermined value or an initial-turning threshold LAPu. Thereafter, the vehicle control apparatus 10 proceeds with the process to a step S235. The initial-turning threshold LAPu is set to a relatively great value which is close to 100%, or is set to 100%.

The lap rate threshold LAPth is a threshold relating to the lap rate LAP, and is used at a step S235 described later. The lap rate LAP is a ratio of an overlap width dW to a full width W of the own vehicle 100 as shown in FIG. 4 (LAP=dW/W). The overlap width dW is a length of a part of the preceding vehicle 200 which is within the full width W of the own vehicle 100 in an own vehicle width direction Y. The own vehicle width direction Y is a direction perpendicular to the front-rear direction X of the own vehicle 100.

Figure 4A:
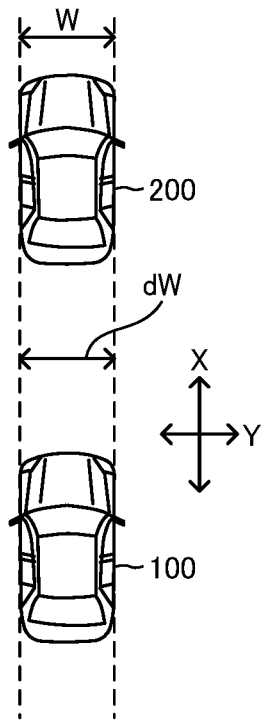
FIGS. 4A-4D show lap rates.
Figure 4B:
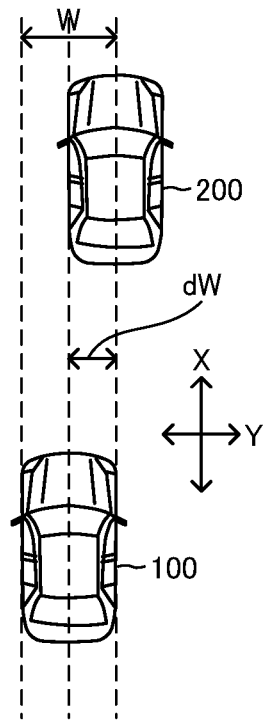
Figure 4C:
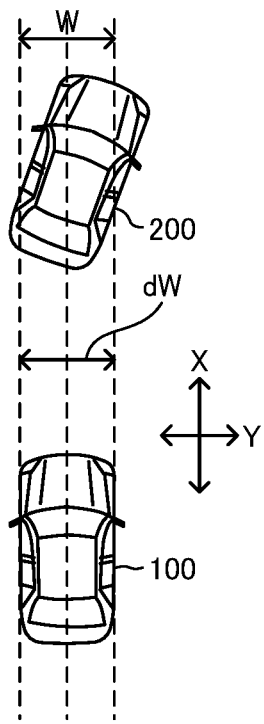
Figure 4D:
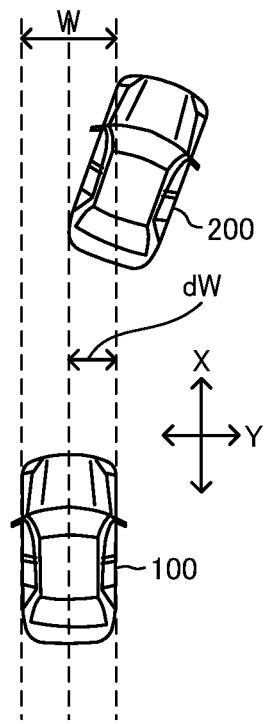

In an example shown in FIG. 4A, the lap rate LAP is 100%, and in an example shown in FIG. 4B, the lap rate LAP is 50%. In an example shown in FIG. 4C, the lap rate LAP is 100%, and in an example show in FIG. 4D, the lap rate LAP is 50%.

When the vehicle control apparatus 10 determines "Yes" at the step S215, the vehicle control apparatus 10 proceeds with the process to a step S225 to set the lap rate threshold LAPth to a predetermined value or a stable-turning threshold LAPs. Thereafter, the vehicle control apparatus 10 proceeds with the process to the step S235. The stable-turning threshold LAPs is set to a relatively great value, but is set to a value smaller than the initial-turning threshold LAPu. It should be noted that the stable-turning threshold LAPs may be set to a constant value regardless of a length of the condition satisfaction period of time T, but may be set to a value, depending on the condition satisfaction period of time T. In this case, for example, the stable-turning threshold LAPs is set such that the stable-turning threshold LAPs decreases as the conditional satisfaction period of time T increases.

When the vehicle control apparatus 10 determines "No" at the step S210, the vehicle control apparatus 10 proceeds with the process to a step S230 to set the lap rate threshold LAPth to a predetermined value or a normal threshold LAPn. Thereafter, the vehicle control apparatus 10 proceeds with the process to the step S235. The normal threshold LAPn is set to a relatively small value close to 0% and smaller than the stable-turning threshold LAPs. In particular the normal threshold LAPn is set to 0%.

When the vehicle control apparatus 10 proceeds with the process to the step S235, the vehicle control apparatus 10 determines whether the lap rate LAP is equal to or greater than the lap rate threshold LAPth. When the vehicle control apparatus 10 determines "Yes" at the step S235, the vehicle control apparatus 10 proceeds with the process to a step S240 to determine whether an inter-vehicle distance D is equal to or smaller than a predetermined distance or a predetermined inter-vehicle distance threshold Dth.

As shown in FIG. 3, the inter-vehicle distance D is a distance between the own vehicle 100 and the preceding vehicle 200. Further, the predetermined inter-vehicle distance threshold Dth is a threshold relating to the inter-vehicle distance D. In the present embodiment, the predetermined inter-vehicle distance threshold Dth is set, based on a predicted reaching period of time TTC, i.e., a period of time which is predicted to be taken for the own vehicle 100 to reach the preceding vehicle 200. That is, the predicted reaching period of time TTC is a value acquired by dividing the inter-vehicle distance D by a relative speed ΔV of the own vehicle 100 with respect to the preceding vehicle 200 (TTC=D/ΔV). The predicted reaching period of time TTC minimally required to avoid the collision of the own vehicle 100 with the preceding vehicle 200 is set as the predetermined predicted reaching period of time TTCth. Then, the vehicle control apparatus 10 sets a value acquired by multiplying the predetermined predicted reaching period of time TTCth by the relative velocity ΔV as the predetermined inter-vehicle distance threshold Dth (Dth=TTCth ΔV).

When the vehicle control apparatus 10 determines "Yes" at the step S240, the vehicle control apparatus 10 proceeds with the process to a step S245 to execute a collision avoidance control. Thereafter, the vehicle control apparatus 10 proceeds with the process to a step S295 to terminate executing this routine once.

The collision avoidance control is a control to decelerate the own vehicle 100 such that the own vehicle 100 does not collide with the preceding vehicle 200, based on the inter-vehicle distance D and the own vehicle moving speed V at a point of time of starting executing the collision avoidance control. It should be noted that when the preceding vehicle 200 is stopped, the own vehicle 100 is stopped prior to reaching the preceding vehicle 200 by the collision avoidance control.

On the other hand, when the vehicle control apparatus 10 determines "No" at the step S235 or the step S240, the vehicle control apparatus 10 proceeds with the process directly to the step S295 to terminate executing this routine once.

Also, when the vehicle control apparatus 10 determines "No" at the step S205, the vehicle control apparatus 10 proceeds with the process directly to the step S295 to terminate executing this routine once.

The operations of the vehicle control apparatus 10 have been described.

<Advantages>

When the preceding vehicle 200 is in front of the own vehicle 100 when the own vehicle 100 starts turning, a range that the lap rate LAP changes is relatively great since a behavior of the own vehicle 100 is not stable until a certain period of time has elapsed since the own vehicle 100 starts to turn. Therefore, even when the own vehicle 100 can pass by the side of the preceding vehicle 200 without colliding with the preceding vehicle 200, the lap rate LAP may change to a great value. Therefore, when the lap rate threshold LAPth is set to a smaller value, there is a probability that the collision avoidance control may be executed when (i) the own vehicle 100 is close to the preceding vehicle 200 to pass by the side of the preceding vehicle 200, and (ii) the lap rate LAP becomes equal to or greater than the lap rate threshold LAPth. That is, the collision of the own vehicle 100 with the preceding vehicle 200 cannot be accurately determined while the own vehicle 100 is turning.

With the vehicle control apparatus 10, when the preceding vehicle 200 exists in front of the own vehicle 100 when the own vehicle 100 starts turning, the lap rate threshold LAPth is set to a relatively great value close to 100% or is set to 100% until a predetermined time, i.e., the predetermined condition satisfaction period of time Tth elapses since the collision probability condition becomes satisfied for the first time. Therefore, the collision avoidance control can be prevented from being executed in situations where the own vehicle 100 is unlikely to collide with the preceding vehicle 200 at an initial-turning stage of the own vehicle 100 in which the behavior of the own vehicle 100 is not stable. That is, the collision of the own vehicle 100 with the preceding vehicle 200 can be accurately determined while the own vehicle 100 is turning.

On the other hand, when a certain period of time has elapsed since the own vehicle 100 started turning, the behavior of the own vehicle 100 becomes stable, and thus the range that the lap rate LAP changes is decreased. Therefore, if the lap rate threshold LAPth is still set to the relatively great value or set to 100%, the collision avoidance control may not be executed even when the own vehicle 100 collides with the preceding vehicle 200. That is, the collision of the own vehicle 100 with the preceding vehicle 200 cannot be accurately determined while the own vehicle 100 is turning.

With the vehicle control apparatus 10, the lap rate threshold LAPth is set to a small value after the predetermined time, i.e., the predetermined condition satisfaction period of time Tth has elapsed since the own vehicle 100 starts to turn. Therefore, the collision avoidance control is executed when the probability that the own vehicle 100 collides with the preceding vehicle 200 is great. That is, the collision of the own vehicle 100 with the preceding vehicle 200 can be accurately determined while the own vehicle 100 is turning.

It should be noted that the present invention is not limited to the above-described embodiments, and various modifications can be adopted within the scope of the present invention.

What is claimed is:

1. A vehicle control apparatus, comprising an electronic control unit configured to execute a collision avoidance control to avoid a collision of an own vehicle with an object ahead of the own vehicle by autonomously decelerating the own vehicle when a collision condition that the own vehicle is predicted to collide with the object, becomes satisfied,
   the collision condition including a condition that a lap rate of the own vehicle and the object is equal to or greater than a lap rate threshold, and
   the electronic control unit being configured to set the lap rate threshold to be greater when the own vehicle turns compared to when the own vehicle does not turn,
   wherein the electronic control unit is configured to set the lap rate threshold to be smaller when a condition satisfaction period of time is equal to or greater than a predetermined period of time compared to when the condition satisfaction period of time is smaller than the predetermined period of time,
   wherein the condition satisfaction period of time is a period of time that a collision probability condition continues being satisfied while the own vehicle is turning, and
   wherein the collision probability condition is a condition that the own vehicle is turning, and a predicted moving route of the own vehicle crosses a predicted moving route of the object.

2. The vehicle control apparatus as claimed in claim 1, wherein the electronic control unit is configured to set the lap rate threshold, depending on the condition satisfaction period of time when the condition satisfaction period of time is equal to or greater than the predetermined period of time.

3. The vehicle control apparatus as claimed in claim 2, wherein the electronic control unit is configured to set the lap rate threshold such that the lap rate threshold decreases as the condition satisfaction period of time increases when the condition satisfaction period of time is equal to or greater than the predetermined period of time.

4. The vehicle control apparatus as claimed in claim 1, wherein the lap rate corresponds to a degree that the own vehicle and the object overlap in a width direction of the own vehicle, and the lap rate threshold corresponds to a threshold degree at which the own vehicle and the object overlap in the width direction of the own vehicle.

* * * * *